J. W. KNIGHT.
Box and Bale Hooks.

No. 151,295.  Patented May 26, 1874.

WITNESSES:

INVENTOR:
J. W. Knight
BY
ATTORNEYS.

UNITED STATES PATENT OFFICE.

JOHN W. KNIGHT, OF GALVESTON, TEXAS.

IMPROVEMENT IN BOX AND BALE HOOKS.

Specification forming part of Letters Patent No. 151,295, dated May 26, 1874; application filed May 16, 1874.

*To all whom it may concern:*

Be it known that I, JOHN W. KNIGHT, of Galveston, Galveston county, Texas, have invented a new and Improved Box and Bale Hook, of which the following is a specification:

My invention consists of a guard or shield, of leather or other equivalent material, combined with the handle and shank of the hook used for turning or otherwise handling bales or boxes, &c., to prevent the hands from rubbing or pressing against the bale or box, whereby they are often injured.

Figure 1:
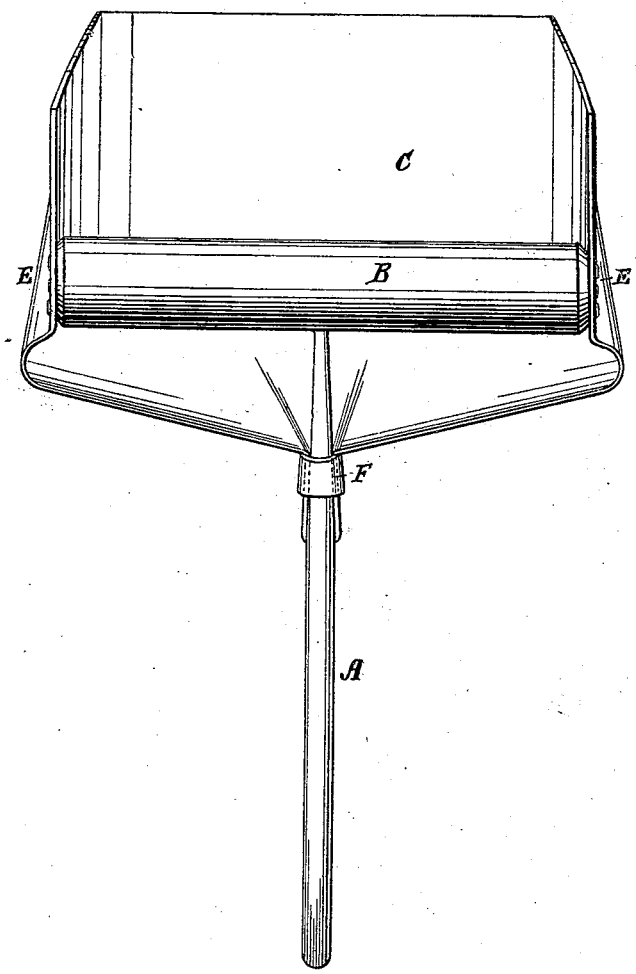
Figure 2:
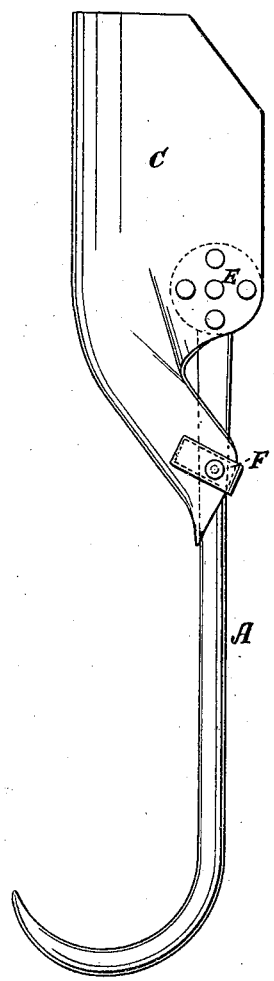

Figure 1 is an elevation of a bale or box hook, with a guard of leather applied according to my invention; and Fig. 2 is another side elevation.

Similar letters of reference indicate corresponding parts.

A is the hook, and B is the handle, of an ordinary bale-hook, to which I propose to apply the guard C, of leather, rubber, strong felt, or any equivalent material, in the manner shown, or in any approved way, so that when by lifting on the box or bale the hand is pressed toward it, the guard will be interposed to protect the hand from the rough surface.

Cotton-bales sometimes have projecting hooks, which cut and tear the hands; and boxes have nails, rough and sharp edges, and the like, which injure the hands without the guard, but which are harmless with it.

In this example, the guard is attached by binding the edges up against the ends of the handle, and nailing them to it, as at E, and looping and binding one edge around the shank of the hook, as shown at F; but it may be attached in any other approved way.

Having thus described my invention, I claim as new and desire to secure by Letters Patent—

The combination of a guard, of leather, C, or other equivalent substance, with a box or bale hook, A B, substantially as specified.

JOHN W. KNIGHT.

Witnesses:
T. B. MOSHER,
ALEX. F. ROBERTS.